Jan. 17, 1967  F. F. A. BRACONIER ET AL  3,299,161
PURIFICATION OF ACETYLENE FROM GASEOUS MIXTURES
Filed Feb. 11, 1963
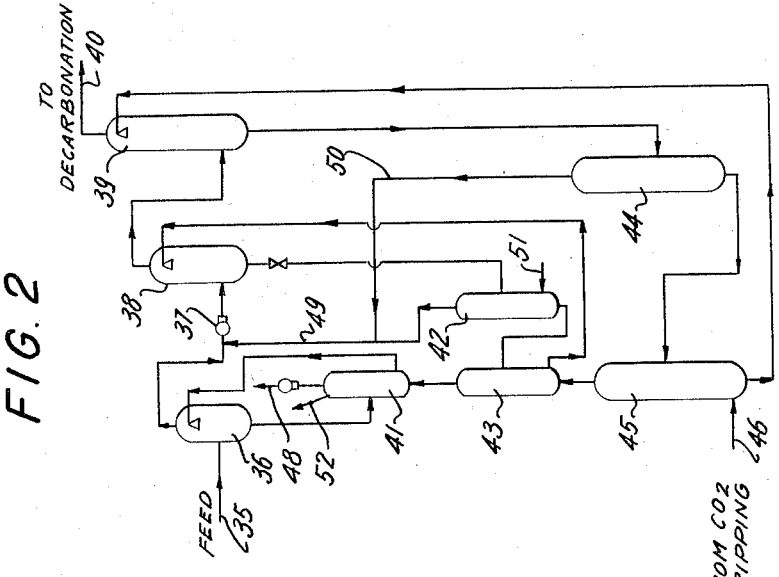
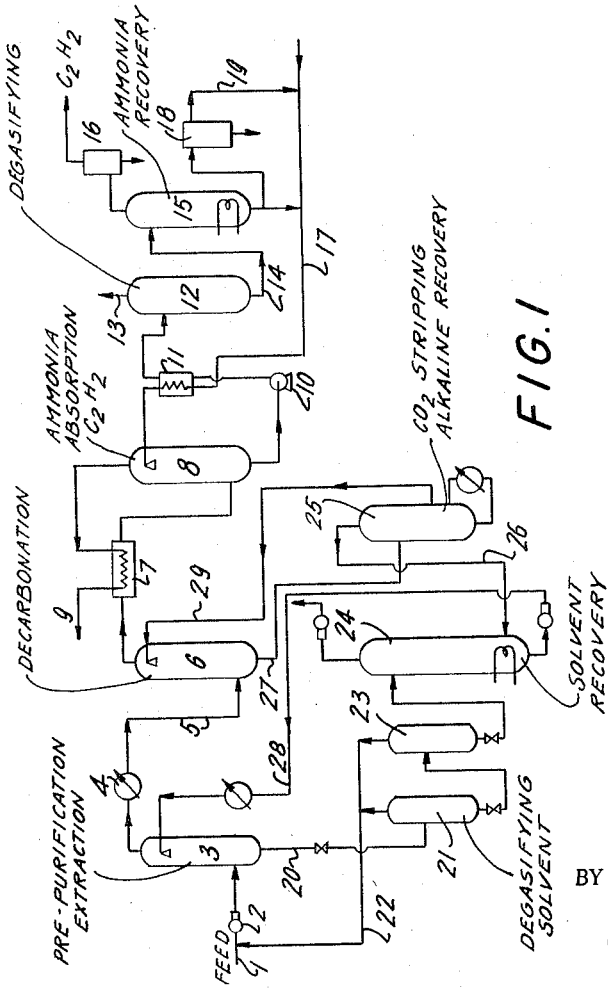
INVENTORS
FREDERIC F.A. BRACONIER
JEAN J. L. E. RIGA
BY
Curtis, Morris & Safford
ATTORNEYS

United States Patent Office

3,299,161
Patented Jan. 17, 1967

3,299,161
PURIFICATION OF ACETYLENE FROM
GASEOUS MIXTURES
Frederic F. A. Braconier, Plainevaux, and Jean J. L. E.
Riga, Liege, Belgium, assignors to Societe Belge de
l'Azote et des Produits Chimiques, Liege, Belgium
Filed Feb. 11, 1963, Ser. No. 257,689
7 Claims. (Cl. 260—679)

This invention relates to gas treating processes for separating relatively pure acetylene from gas mixtures including acetylene admixed with a variety of other gaseous materials and, more particularly, to the separation of relatively pure acetylene from such gaseous mixtures produced by the pyrolysis of various hydrocarbons.

As will be understood, unsaturated hydrocarbons such as acetylene and olefines may be prepared by the pyrolysis or thermal decomposition of more saturated hydrocarbons, for example by partial combustion of the more saturated hydrocarbons and/or by injection thereof into hot gases obtained by the complete combustion of a fuel gas. In addition to the desired acetylene or olefine products obtained from such pyrolysis reactions, the gaseous mixtures resulting therefrom also include a variety of other unsaturated hydrocarbon materials, such as diacetylene, methylacetylene, other higher homologues of acetylene, propadiene, butadiene, etc., as well as other saturated and unsaturated aliphatic and aromatic hydrocarbons having more than two carbon atoms, and inorganic gaseous components including hydrogen, carbon dioxide, carbon monoxide, nitrogen, etc. The desired acetylene and/or ethylene products are thus quite substantially diluted and contaminated by a variety of other materials in the gaseous resultant mixture from such pyrolysis reactions, from which it is desired to separate the acetylene and/or ethylene in relatively pure state and at optimumly high yields in order for these desired products to be utilized appropriately for the particular applications for which they were synthesized in the first place, and, most notably, as starting materials in various chemical synthesis reactions.

The purification or separation of relatively pure acetylene and/or ethylene components from such pyrolysis gas mixtures may be attempted in a variety of manners. For example, a particularly satisfactory process for such purification is disclosed in Patent 3,026,969 as in involving, first, the elimination of carbon dioxide from such mixtures and, thereafter, the sequential treatment of the mixture with complementary solvents (e.g., a kerosene hydrocarbon solvent fraction and anhydrous liquid ammonia) for the sequential removal first of hydrocarbon impurities or contaminants and, then, the separation of acetylene in an ammonia fraction for subsequent rectification. As noted in such patent, a kerosene fraction of petroleum hydrocarbons and anhydrous liquid ammonia are particularly advantageous complementary solvents in that acetylene is relatively insoluable in the kerosene fraction, although other impurities are; while those impurities which escape the kerosene extraction and end up in the acetylene fraction are relatively readily eliminated when the acetylene is ultimately separated by washing with liquid ammonia.

In such processes, the preliminary elimination of carbon dioxide from the pyrolysis gases may be readily effected by anyone of a number of known methods, for example, utilizing alkaline solutions of carbonates, organic amines, ammoniacal materials, etc. Also as indicated in such patent, the separating or purifying operations are preferably carried out under a super-atmospheric pressure above 5 atms. and, indeed, between 10–15 atms., although such operations may also be carried out under atmospheric pressure but with substantially less advantage because of such factors as requiring substantially larger apparatus for accommodating the larger gas volumes, as well as perhaps obtaining a less complete degree of purity of the extracted acetylene.

In attempting acetylene purifications or separations in accordance with such prior techniques, it has been discovered that certain of the unsaturated hydrocarbon components or contaminants originally present in the pyrolysis gases may have a tendency to dissolve rather readily in the alkaline solutions used for the preliminary elimination of carbon dioxide, and to form therein viscous polymer products during attempted and desirable regeneration of such alkaline solutions for reuse, which polymer products complicate or interject difficulties into the regeneration steps.

According to this invention, however, such difficulties in prior procedures of the character described are substantially eliminated or minimized in that decarbonation or carbon dioxide removal from the original pyrolysis gas mixture is achieved substantially without undesired dissolving of unsaturated hydrocarbon contaminants in the decarbonation solvent, and this invention also achieves substantial improvement in the energy balance of the entire operation including carbon dioxide removal, kerosene washing of hydrocarbon contaminants, and regeneration of the various treating materials and solvents for reuse as desirable in large scale commercial production installations. Generally, such enhanced results are achieved in accordance herewith by solvent extraction or removal of unsaturated hydrocarbon contaminants (particularly having more than two carbon atoms per molecule) prior to elimination of carbon dioxide from the pyrolysis gas mixture, with subsequent regeneration of the extracting solvent for reuse, and also regeneration of the alkaline solution used for carbon dioxide removal, with stripping of the carbon dioxide therefrom to be utilized in the above noted regeneration of the extracting solvent for the initial pre-purification step, and ultimately the separation of acetylene in a complementary solvent such as liquid ammonia for recovery therefrom as a relatively pure acetylene product.

With the foregoing and additional objects in view, this invention will be more particularly described, and other objects and advantages thereof will be apparent from the following description, the accompanying drawings, and the appended claims.

In the drawing:
FIG. 1 is a diagrammatic or schematic flow diagram indicating the various steps and apparatus arrangements of a gas treating process embodying and for practicing this invention; and
FIG. 2 is a similarly diagrammatic or schematic flow sheet arrangement of another modification embodying and for practicing this invention.

As merely illustrative of one embodiment of this invention with which satisfactory results have been achieved and operating generally with the apparatus and operating conditions of the above noted prior patent (although with a difference sequence of steps), one may note a cycle or sequence of steps including pre-purification of the pyrolysis gas mixture (after the removal therefrom of the carbon black and tars, etc. in known manner) by solvent extraction of unwanted hydrocarbon components with a kerosene hydrocarbon solvent fraction (boiling between about 175° and 225° and having an average molecular weight of about 180) at a temperature of about −120° to −30° C., with subsequent regeneration of the extracting solvent by stripping or entrainment of the dissolved impurities therefrom with carbon dioxide gas at substantially atmospheric pressure. Thereafter, a decarbonation or carbon dioxide removal from the thus treated gas mixture is achieved by washing with an alkaline solution at a temperature of about 20° to 30° C., with the subsequent regeneration of such alkaline solution, including stripping therefrom of carbon dioxide in gaseous form, which may then be used as the carbon dioxide stripping agent for the above noted regeneration of the kerosene solvent. Then, acetylene is selectively extracted or separated from the resulting effluent from the foregoing steps by dissolving in anhydrous ammonia at temperatures of about −30° C. to −50° C., from which ammonia solution the ultimately pure acetylene is separated by distillation or other degasifying or rectifying techniques.

As will be noted in such an embodiment, the sequence of operations involves three sequential treatments of the pyrolysis gas at temperatures within the ranges of −20° to −30° C., +20° to +30° C., and −30° to −50° C.—thereby requiring a substantial caloric exchange in various cooling and treating steps to provide a variety of operations at widely different temperature ranges with, of course, certain inevitable energy balance or thermal inefficiencies, particularly in large scale operations. Although the results of such procedures in accordance herewith are enhanced as compared with more conventional or prior art techniques, a more preferred sequence or technique in accordance herewith, giving further enhanced energy balance and thermal efficiencies, permits the hydrocarbon extraction step and subsequent regeneration of the hydrocarbon extracting solvent at temperatures generally about 45° C.

In such an arrangement, generally, the initial pre-purification or hydrocarbon extraction with a kerosene solvent and the subsequent regeneration of such solvent for reuse occurs under preferably isothermal conditions as close as practicable to temperatures of about 45° C. In such operations hereunder, a better energy balance is achieved for the successive stages of pre-purification with hydrocarbon solvent, decarbonation or carbon dioxide removal, and ultimate selective extraction of acetylene at the respective temperature ranges of about 45° C., 25° to 30° C., and −30° C.

Although it is to be understood that the first type of operation mentioned above is to be comprehended within this disclosure and as distinct from that of the above noted prior patent, the second sequence of operations or techniques is to be preferred in accordance herewith and as giving more optimum results, and such techniques are illustratively indicated in the arrangement diagrammed in FIG. 1, which may be described in more detail along the following lines.

Thus, the mixture of gases resulting from the pyrolysis reaction (after having been freed in known manner from carbon black and tarry materials and other condensible constituents) is introduced through conduit 1 to a compressor 2 in which the pressure of the gaseous mixture is increased to about 10 atms. The compressed pyrolysis gas, after having been cooled in known manner to about 40° C., is introduced into the lower part of an extraction column 3 where it is washed by counter-current flow of the noted kerosene hydrocarbon fraction extracting solvent. In this pre-purification step, the preponderant part of the heavier unsaturated hydrocarbons in the original pyrolysis gases (particularly those having more than two carbon atoms) is dissolved or extracted by the kerosene solvent, as well as a small amount of acetylene and/or ethylene. Preferably, such pre-purification extraction operation is controlled to take place at a temperature relatively close to about 45° C., with the pre-purified gaseous component being withdrawn from the top of column 3 and introduced through a cooling device to reduce the temperature down to about 30° C.

The resulting cooled gas mixture is fed through line 5 into the lower portion of a decarbonation column 6 where carbon dioxide removal is effected by washing the gas mixture in counter-current flow with an alkaline solution, preferably ammoniacal, in known manner, with the temperature in column 6 being maintained at about 30° C. The pre-purified and decarbonated gas mixture is fed from the top of decarbonation column 6 (after having been cooled in heat exchanger 7 down to a temperature of about +5° C.) into acetylene extraction column 8 where acetylene is selectively absorbed or extracted from the gas mixture by means of anhydrous liquid ammonia and generally at a temperature of the order of around −30° C. Preferably, as indicated by the line 9, the cooling of the gas mixture in heat exchanger 7 is achieved by utilizing the cooling potential of the cool gas mixture from the top of column 8, which gas is then fed through conduit 9 to conventional recovery apparatus (not shown) for the ultimate recovery of the ammonia for reuse.

As will be apparent from the foregoing, the passage of the gaseous mixture through liquid ammonia in acetylene extraction column 8 causes vaporization of part of the liquid ammonia, with a resulting cooling, etc., which provides a certain automatic thermal regulation thereof. That part of the liquid ammonia which has dissolved the acetylene product from the gases in column 8 is collected and withdrawn from the bottom thereof and, preferably after compression in compressor 10 and passage through cooling heat exchanger 11, is introduced to de-gasifying column 12 wherein any ethylene removed by the ammonia extraction is stripped or released from the ammonia solution (along with, perhaps, a small portion of dissolved acetylene) either by partial expansion of the liquid and/or heating thereof, etc.

The resulting ethylene-acetylene mixture is preferably re-cycled (through conduit 13) to the original feed inlet 1, after elimination of entrained ammonia by means of a water wash (not shown). The acetylene-containing liquid ammonia, thus freed from ethylene, is introduced from degasifying column 12 into stripping column 15 through conduit 14, where relatively pure acetylene is separated from the ammonia solvent as by expansion thereof and/or low temperature heating. The acetylene product, accompanied by some gaseous ammonia is fed from the top of column 15 into a washer or stripping arrangement 16, wherein relatively pure acetylene is separated as by washing from entrained ammonia. Liquid anhydrous ammonia withdrawn from the bottom of column 15 is substantially free of acetylene, but may still contain some small amount of hydrocarbon impurities which had not completely been eliminated during the pre-purification extraction with kerosene in column 3. Accordingly, depending upon the foregoing situation, all or a major part of the liquid ammonia may be immediately reintroduced into acetylene extraction column 8 through line 17 and/or a portion thereof introduced into a recovery distillation in column 18 for removal of residual impurities, and thereafter fed through conduits 19 and 17 back for subsequent acetylene separation in column 8.

The bulk of hydrocarbon impurities in the original pyrolysis gas mixtures, as will be understood, is contained in the kerosene solvent extract fraction removed from the bottom of pre-purification column 3, and the pressure of that solution is about 10 atms. Such extract solution is introduced, through conduit 20, into a de-gasification column 21 where a major portion of dissolved acetylene and ethylene are eliminated by pressure reduction down to about 3 atms., to be fed through conduit 22 back to gas inlet 1, while the remaining extract solvent solution is introduced to a second stage de-gasification column 23 operated at a pressure of about 1.5 atms. for liberation of any remaining portions of acetylene and/or ethylene, as well as other light impurities such as propylene, butadiene, propadiene, etc., which are also re-introduced into gas inlet 1 through conduit 22.

The remaining kerosene solution, thus freed of the readily stripped gaseous components of lower unsaturated hydrocarbons, is then introduced into a final purification step in column 24 for stripping therein, under a reduced pressure of about 0.2–0.3 atms., with carbon dioxide to recover or regenerate a fairly pure kerosene solvent extract fraction for reuse in the pre-purification step and to be introduced into column 3 through conduit 28. Preferably in accordance herewith, the carbon dioxide used for stripping in solvent recovery column 24, is derived from that separated from the original pyrolysis gases in decarbonation column 6. Thus, the alkaline decarbonation solution from the bottom of column 6 is introduced through conduit 27 into a stripping column 25 in which carbon dioxide gas is separated and introduced through conduit 27, while the stripped alkaline decarbonation solution is fed from column 25 back to the top of decarbonation column 6 through line 29.

As indicated by a heating element diagrammed in the bottom of column 24, some slight heating may be necessary or desired in the solvent recovery step in order to obtain the desired stripping, and an economizer may be desired to recover maximum amount of calories between the kerosene solvent entering and leaving column 24. With the recovery of alkaline decarbonation solution, however, the carbonated solution withdrawn from the bottom of column 6 and fed through conduit 27 to recovery column 25 is readily handled, because of the temperature differences between interconnected columns 24 and 25, by heating the solution (as by means of merely hot water circulation to a temperature of no more than about 70° C.). The thus liberated carbon dioxide is fed through conduit 26 to the bottom of solvent recovery column 24, where it is utilized as a stripping or carrying gas, while the regenerated alkaline solution is re-introduced from the bottom of column 25 directly into decarbonation column 6 as noted.

Such a cycle or sequence of operations is particularly preferred in accordance herewith because it produces acetylene (although originally comprising only a minor portion of the total volume of the original pyrolysis gases) in a final and practically pure state (purity above 99.61%), while also presenting an enhanced and particularly advantageous energy balance throughout the entire system. Similarly, this particular sequence of operations, as compared with prior concepts of decarbonation before hydrocarbon removal, permits a certain amount of ammonia vapor to be entrained in the pyrolysis gases at the outlet of the decarbonation column 6 but such situation does not interject inefficiencies into the arrangement because, for example in the following step, the gas mixture is treated with anhydrous ammonia. For this reason, it is preferred in accordance herewith that the alkaline decarbonation solution be one of an ammoniacal nature, rather than other equally suitable carbon dioxide stripping materials.

Although the operations described above are to be considered as generally illustrative of preferred embodiments in accordance herewith, it is to be understood that variants are also to be comprehended as included herein and have been used to produce satisfactory results. For example, one modification is indicated in the arrangement diagrammed in FIG. 2.

In the arrangement of FIG. 2, a progressive or stepwise pre-purification of the pyrolysis gas mixture by means of the kerosene hydrocarbon solvent is utilized as enhancing the initial absorption of unsaturated hydrocarbon impurities in the solvent and the ultimate elimination of such impurities during solvent recovery. That is, as will be understood, those gaseous impurities which are most readily absorbed in a hydrocarbon solvent are also the most difficult to eliminate therefrom during recovery operations. In the particular gas mixtures here under consideration, different operating conditions may be required to maximize separation of relatively light impurities (such as three-carbon hydrocarbons) as compared with heavier contaminants (such as hydrocarbons having more than eight carbon atoms).

Thus, in the FIG. 2 arrangement, the gas mixture from the pyrolysis reaction is introduced at inlet 35 and is subjected to a plurality of sequential solvent extraction steps with the kerosene hydrocarbon solvent. The first of these steps, preferably at atmospheric pressure and at a temperature of about 35° C., is conducted in column 36, and about 1% the total amount of kerosene solvent is utilized for the removal in this step of about 60% of the hydrocarbon contaminants having more than eight carbon atoms. The gas mixture from column 36, preferably having been compressed to a pressure of about 10 atms. at compressor 37, is introduced into a second-stage extraction column 38 wherein washing or solvent extraction is accomplished with about 5% of the total amount of kerosene and at a temperature of about 45° C., for the removal of about 80% of the remaining hydrocarbons having more than eight carbon atoms, about 90% of 6-carbon hydrocarbons, and about 50% of 5-carbon hydrocarbons. Subsequently, the gas mixture is introduced into a third-stage extraction column 39, still under the pressure of about 10 atms. and the temperature of about 45° C., and subjected to extraction with the remainder of the hydrocarbons solvent to achieve the ultimately desired complete pre-purification, after which the gas mixture is fed through conduit 40 into a decarbonation column (such as column 6 as noted in FIG. 1) and the sequence of operations above described for the FIG. 1 embodiment are completed as described in accordance therewith.

With such stepwise pre-purification or hydrocarbon extraction and with the removal of unsaturated heavy hydrocarbon impurities conducted under atmospheric pressure, the tendency of polymerization of the heavy hydrocarbons and clogging of compressor 37, etc. are substantially reduced. Similarly, the recovery treatment is simplified or enhanced from the standpoint of efficiency in the regeneration of solvent from columns 36, 38, and 39 by stripping with carbon dioxide. Thus, on one embodiment of such kerosene solvent regeneration as indicated in FIG. 2, the solvent withdrawn from the bottom of column 36 undergoes a stripping step in column 41 and at a reduced pressure of about 0.2 atm. The solvent from column 38, after undergoing preliminary expansion to a pressure of about 1 atm. in column 42, is then stripped with carbon dioxide at a pressure of about 0.2 atm. in column 43. The solvent withdrawn from the bottom of column 39 is subjected to the same expansion and stripping steps in columns 44 and 45.

The several solvent stripping columns 41, 43, and 45 are preferably disposed serially, and carbon dioxide is introduced thereinto at the bottom of column 45 through line 46 (which, preferably, may lead from carbon dioxide stripping and alkaline solution recovery column 25 of FIG. 1) and is fed sequentially through stripping columns 45, 43, and 41, as noted, to entrain the several dissolved impurities, which are collected through an outlet 52 and with the low pressures being maintained by a vacuum or exhausting device 48. The gaseous fractions liberated in expansion columns 42 and 44 include primarily two-carbon hydrocarbons which were dissolved in the extracting solvent, and these are fed back into the purification cycle (preferably prior to compressor 37) through conduits 49 and 50, for admixture with the gases being subjected to the several stepwise solvent extraction pre-purification steps. Otherwise, the gaseous effluent from conduit 40 is subjected, in this embodiment, to the subsequent steps previously described, and the carbon dioxide ultimately stripped from the decarbonation solvent at column 25 in FIG. 1 is utilized to supply the stripping of hydrocarbon in this embodiment from the extracting solvent as by being introduced into carbon dioxide inlet 46.

As merely illustrative of satisfactory results in accordance with this invention, one may note the following specific example relating to the treatment of a pyrolysis gas mixture obtained by partial combustion of methane for the separation of relatively pure acetylene therefrom and recovery or regeneration of the hydrocarbon extracting solvent, etc., as explained generally herein. For purposes of aiding in the better understanding of this particular example, the compositions of the several components in the several steps of the processing are set forth in the following table, with the composition of gaseous components being given in molar units (expressed in kilomoles per hour), while the solvent amounts in the following description are noted in tons per ton of pure acetylene obtained at the end of the cycle:

| Constituents | Pyrolysis Gas | | | Solutions |
| --- | --- | --- | --- | --- |
| | Inlet col. 36 | Inlet col. 38 | Inlet col. 8 | (Outlet col. 8) |
| $H_2$ | 606.93 | 622.75 | 614.12 | |
| $CO+N_2$ | 295.5 | 308.70 | 299.57 | |
| $CO_2$ | 33.4 | 47.53 | | |
| $CH_4$ | 51.1 | 56.00 | 51.74 | |
| $C_2H_2$ | 84.23 | 114.51 | 90.58 | 91.42 |
| $C_2H_4$ | 4.70 | 5.97 | 4.75 | 0.13 |
| $C_3-C_8$ | 4.88 | 6.04 | 0.15 | 0.20 |
| $C_8$ | 0.11 | 0.036 | 0.032 | 0.88 |
| $C_{10}$ | 0.055 | 0.020 | | |
| $NH_3$ | | | | 1,085.04 |

The gas mixture from the pyrolysis reaction, having the composition noted above and after having been freed in known manner from carbon black and tarry materials, is introduced through inlet 35 into column 36, to be washed with the particular kerosene extracting solvent noted at a temperature of about 35° C. and under a pressure of about 1 atm. About 2.5 tons of kerosene are utilized per ton of pure acetylene recovered. After such operation (which may be called "denaphthalenization" and which aims at the elimination of a substantial part heavy hydrocarbons), the resulting gas mixture is admixed with the various gaseous fractions re-cycled through conduits 49 and 50, and the resulting mixture (of the above noted composition) is compressed to 10 atmospheres and introduced into column 38 for additional pre-purification by 10 tons of kerosene solvent per ton of final acetylene recovered at a temperature about 45° C. and a pressure of about 10 atms. After a subsequent treatment with kerosene solvent in column 39 (about 165 tons per ton of acetylene recovered), the gaseous mixture leaves the pre-purification cycle and was introduced into decarbonation column 6 for elimination of carbon dioxide therein, under operating conditions of 10 atms. pressure and a temperature of about 35° C. at the top of the column, and utilizing an ammoniacal solution at the rate of about 85 gms. ammonia per liter of solution, with the total amount corresponding to approximately 25 tons of solution per ton of pure acetylene recovered. Upon emerging from the top of decarbonation column 6, the gas mixture contained only about 2.4 kilomoles of carbon dioxide—i.e., 0.07 mole percent.

The thus pre-purified and decarbonated pyrolysis gas, after passing through heat exchanger 7 in which the temperature of the gas was decreased to about −18° C. by thermal exchange with gaseous effluent from column 8, was introduced into the bottom of column 8 at the compositions indicated in the above table. In acetylene absorption column 8, the gas mixture was treated at about 9 atms. and −30° C. with anhydrous liquid ammonia in an amount of about 10 tons per ton of pure acetylene ultimately recovered, and the residual gas leaving the top of column 8 contained virtually no acetylene (less than 0.025 mole percent), and comprised essentially, in addition to minor amounts of methane and ethylene, the inorganic constituents from the original pyrolysis gas such as hydrogen carbon monoxide, nitrogen, etc. The solution withdrawn from the bottom of column 8 is introduced into de-gasifying column 12, for the liberation of the preponderant portion of any dissolved ethylene, and at a pressure of about 5 atms. and a temperature of about −5° C. The solution of acetylene in liquid ammonia withdrawn from the bottom of de-gasifying column 12 and introduced into column 15 for treatment at about 5 atms. and 5° C. (at the bottom of the column) was freed therein from relatively pure acetylene. Such acetylene component, including some entrained gaseous ammonia, was introduced into column 16 for final elimination of ammonia by means of washing with water at about 1 atm. and 25°–20° C., to produce a final yield of 88.652 kilomoles of acetylene having a purity of about 99.8%.

The kerosene fraction, containing impurities dissolved therein and withdrawn from the final pre-purification step at the bottom of column 39, was fed into column 44 for expansion down to 1 atm. and a slight heating to 65° C., before being fed into stripping column 45. Similarly, the hydrocarbon solvent withdrawn from the bottom of column 38 was fed into column 42 to be stripped therein by means of residual gas (about 1%) fed through conduit 51 under atmospheric pressure and a temperature of about 45° C., before the resulting solvent was introduced into column 43 for final treatment.

Those of the lighter gaseous impurities (principally 2-carbon hydrocarbons) which were dissolved in the extracting solvent in columns 38 and 39 are freed by expansion in columns 42 and 44, respectively, and are thereafter introduced or re-cycled (through conduits 49 and 50) into the pre-purification steps as noted. The first stage extracting solvent, containing primarily heavy impurities and withdrawn from the bottom of column 36, is fed for stripping in column 41, as noted.

As will also be noted, the separation of the various kerosene solvent fractions in the stepwise pre-purification arrangement of FIG. 2 is maintained, with the re-cycling of the regenerated solvent fractions returning, respectively, to the steps from which they originated. Thus, the heavy-impurity extracting solvent is returned from regenerating column 41 back to column 36, the kerosene fraction from column 38 and regenerated in column 43 is returned to its originating step, while the final kerosene solvent withdrawn from the bottom of column 39, and after expansion and stripping through columns 44 and 45, is returned back to column 39 for a subsequent and pre-purification extraction step therein.

Also, as noted, the carbon dioxide, freed from decarbonating solution in column 25, is fed into the solvent regeneration system (for example, through line 46) for sequential introduction through columns 45, 43, and 41, all of which are maintained under pressure of about 0.25 atm. by discharge or vacuum outlet or device 48, and the resulting effluent carbon dioxide, having entrained more and more of the heavy contaminants or impurities, is preferably exhausted or wasted as through an outlet 52 as desired.

As will be apparent from the foregoing, the methods and sequence of operations in accordance herewith provide for the continuous and cyclic separation of extremely pure acetylene from pyrolysis reaction gas mixtures, and in a manner which permits enhanced efficiencies with regard to thermal considerations as well as with regard to pressure and volume considerations in handling the requisite large quantities of gases and solvents in commercial operations. Further, the various hydrocarbon extracting and decarbonation solvents are readily and simply recovered for reuse, with the carbon dioxide originally removed from the gases being used efficiently in the hydrocarbon solvent recovery step, while further efficiencies are obtained by utilizing the cooling potential of the inevitable evaporation of some of the liquid ammonia for obtaining necessary temperature regulation and cooling in other steps of the process.

While the methods and forms of apparatus herein described constitute preferred embodiments of the invention, it is to be understood that the invention is not limited

What is claimed is:

1. In a process for the separation and purification of acetylene from gaseous mixtures which also include substantial proportions of other hydrocarbons and carbon dioxide and other inorganic gases, the steps which comprise extracting said other hydrocarbons from said gaseous mixture with a solvent consisting essentially of a kerosene fraction of petroleum hydrocarbons, thereafter decarbonating the thus treated gaseous mixture with an alkaline aqueous solution for the removal therefrom of carbon dioxide, and thereafter separating said acetylene from the thus treated gaseous mixture by extraction with anhydrous liquid ammonia.

2. In a process for the separation and purification of acetylene from gaseous mixtures which also include substantial proportions of other hydrocarbons and carbon dioxide and other inorganic gases, the steps which comprise extracting said other hydrocarbons from said gaseous mixture with a solvent consisting essentially of a kerosene fraction of petroleum hydrocarbons at temperatures within the range of about $-20°$ to $-30°$ C., thereafter decarbonating the thus treated gaseous mixture with an alkaline aqueous solution at temperatures within the range of about $20°$ to $30°$ C. for the removal therefrom of carbon dioxide, and thereafter separating said acetylene from the thus treated gaseous mixture by extraction with anhydrous liquid ammonia at temperatures within the range of $-30°$ to $-50°$ C.

3. In a process for the separation and purification of acetylene from gaseous mixtures which also include substantial proportions of other hydrocarbons and carbon dioxide and other inorganic gases, the steps which comprise extracting said other hydrocarbons from said gaseous mixture with a solvent consisting essentially of a kerosene fraction of petroleum hydrocarbons at temperatures within the range of about $45°$ C., thereafter decarbonating the thus treated gaseous mixture with an alkaline aqueous solution at temperatures within the range of about $25°$ to $30°$ C., for the removal therefrom of carbon dioxide, and thereafter separating said acetylene from the thus treated gaseous mixture by extraction with anhydrous liquid ammonia at temperatures within the range of $-30°$ to $-50°$ C.

4. In a process for the separation and purification of acetylene from gaseous mixtures which also include substantial proportions of ethylene and other hydrocarbons and carbon dioxide and other inorganic gases, the steps which comprise extracting said other hydrocarbons from said gaseous mixture with a solvent consisting essentially of a kerosene fraction of petroleum hydrocarbons, thereafter decarbonating the thus treated gaseous mixture with an alkaline aqueous solution for the removal therefrom of carbon dioxide, thereafter separating said acetylene from the thus treated aqueous mixture by extraction with anhydrous liquid ammonia, recovering said kerosene fraction solvent for reuse in said hydrocarbon extraction step by removing hydrocarbons dissolved at said kerosene fraction with gaseous carbon dioxide, recovering said aqueous alkaline solution for reuse in said decarbonation step by stripping carbon dioxide dissolved in said aqueous solution, and recycling said carbon dioxide stripped from said aqueous solution through said kerosene fraction recovery step.

5. In a process for the separation and purification of acetylene from gaseous mixtures which also include substantial proportions of ethylene and other hydrocarbons and carbon dioxide and other inorganic gases, the steps which comprise extracting said other hydrocarbons from said gaseous mixture with a solvent consisting essentially of kerosene fraction of petroleum hydrocarbons at temperatures within the range of about $-20°$ to $-30°$ C., thereafter decarbonating the thus treated gaseous mixture with an alkaline aqueous solution at temperatures within the range of about $20°$ to $30°$ C. for the removal therefrom of carbon dioxide, thereafter separating said acetylene from the thus treated aqueous mixture by extraction with anhydrous liquid ammonia at temperatures within the range of $-30°$ to $50°$ C., recovering said kerosene fraction solvent for reuse in said hydrocarbon extraction step by removing hydrocarbons dissolved at said kerosene fraction with gaseous carbon dioxide, recovering said aqueous alkaline solution for reuse in said decarbonation step by stripping carbon dioxide dissolved in said aqueous solution, and recycling said carbon dioxide stripped from said aqueous solution through said kerosene fraction recovery step.

6. In a process for the separation and purification of acetylene from gaseous mixtures which also include substantial proportions of ethylene and other hydrocarbons and carbon dioxide and other inorganic gases, the steps which comprise extracting said other hydrocarbons from said gaseous mixture with a solvent consisting essentially of kerosene fraction of petroleum hydrocarbons at temperatures within the range of about $45°$ C., thereafter decarbonating the thus treated gaseous mixture with an alkaline aqueous solution at temperatures within the range of about $25°$ to $30°$ C. for the removal therefrom of carbon dioxide, and thereafter separating said acetylene from the thus treated aqueous mixture by extraction with anhydrous liquid ammonia at temperatures within the range of $-30°$ to $50°$ C., recovering said kerosene fraction solvent for reuse in said hydrocarbon extraction step by removing hydrocarbons dissolved at said kerosene fraction with gaseous carbon dioxide, recovering said aqueous alkaline solution for reuse in said decarbonation step by stripping carbon dioxide dissolved in said aqueous solution, and recycling said carbon dioxide stripped from said aqueous solution through said kerosene fraction recovery step.

7. In a process for the separation and purification of acetylene from a gaseous mixture of pyrolysis gases which also includes substantial proportions of other hydrocarbons and carbon dioxide and other inorganic gases, the steps which comprise extracting said other hydrocarbons from said gaseous mixture with a solvent consisting essentially of a kerosene fraction of petroleum hydrocarbons, removing carbon dioxide from said gaseous mixture by scrubbing with an aqueous ammoniacal solution, separating acetylene from the thus treated gaseous mixture by dissolving in anhydrous liquid ammonia, recovering said kerosene fraction for reuse by stripping with carbon dioxide gas to remove said other hydrocarbons dissolved therein, said stripping step being conducted at substantially the same temperature range as said hydrocarbon extraction step, and recovering from said carbon dioxide removable step both said aqueous alkaline solution for reuse therein and carbon dioxide for use in said kerosene fraction recovery step.

References Cited by the Examiner

UNITED STATES PATENTS 3,026,969 3/1962 Braconier et al. ___ 260—679 X

FOREIGN PATENTS 544,850 8/1957 Canada.

DELBERT E. GANTZ, *Primary Examiner.*

G. E. SCHMITKONS, *Assistant Examiner.*